United States Patent [19]
Matson

[11] 3,855,099
[45] Dec. 17, 1974

[54] ELECTRODE FOR ANODIC STRIPPING VOLTAMMETRY

[75] Inventor: Wayne R. Matson, Ayer, Mass.

[73] Assignee: Environmental Sciences Associates, Inc., Burlington, Mass.

[22] Filed: Jan. 29, 1973

[21] Appl. No.: 327,788

Related U.S. Application Data

[63] Continuation-in-part of Ser. No. 168,161, Aug. 7, 1971, abandoned.

[52] U.S. Cl. .......... 204/195 F, 204/290 R, 204/294
[51] Int. Cl. ...... G01n 27/26, B01k 3/04, B01k 3/06
[58] Field of Search ............ 204/290 R, 195 F, 294

[56] References Cited
UNITED STATES PATENTS

| | | | |
|---|---|---|---|
| 870,674 | 11/1907 | Guess et al. | 204/195 R |
| 1,302,824 | 5/1919 | Marsh | 204/266 |
| 3,446,607 | 5/1969 | Volk et al. | 204/290 R |

OTHER PUBLICATIONS
Analytical Chem., Vol. 37, No. 12, pp. 1594, 1595; 1965 by Matson et al.

J. Electroanal. Chem., Vol. 27, No. 2, pp. 273–281, (1970), by Florence.

Primary Examiner—F. C. Edmundson
Attorney, Agent, or Firm—Frank A. Steinhilper; Alfred H. Rosen

[57] ABSTRACT

An electrode for anodic stripping voltammetry comprises an electrically conductive, chemically inert support such as a graphite or similar support having a lateral electrode surface with an electrode metal on the surface. The electrode can be prepared by impregnating a support such as a graphite rod with a film forming insulator, such as a wax, laying bare surface areas of graphite particles, and thereafter depositing a metal on the graphite. Metals include mercury, gold, platinum, bismuth or bismuth amalgam, silver and others.

10 Claims, 3 Drawing Figures

ELECTRODE FOR ANODIC STRIPPING VOLTAMMETRY

CROSS-REFERENCE TO COPENDING APPLICATION

This application is a continuation-in-part of my copending application Ser. No 168,161, filed Aug. 7, 1971, now abandoned.

BACKGROUND OF THE INVENTION

In the art known as anodic stripping voltammetry, it is usual to test for minute amounts of ionic impurities such as, specifically, certain metallic impurities by a process in which generally the appropriate metal is first electrochemically deposited on an electrode and is subsequently electrochemically stripped off the electrode. When this process is applied to cationic materials such as metals, the stripping step is accomplished by anodic treatment, from which the name anodic stripping voltammetry derives.

One of the key elements of apparatus or system for anodic stripping voltammetry is an electrode onto which or into which the metal may be plated or electrolytically alloyed, and from which it may subsequently be stripped. In the past, electrode materials such as platinum have been employed with corresponding expense and difficulty. More recently (Matson, Wayne R.; Griffin, Reginald M.; Schreiber, George B. "Rapid Sub-Nanogram Simultaneous Analysis of Zn, Cd, Pb, Cu, Bi and Tl," *Trace Substances in Environmental Health* — IV, 1971, University of Missouri, Dr. D. Hemphill, Ed.; pp. 396-406) there have been used electrodes having an active layer of mercury on a surface of a graphite electrode. According to the system employed in this reference, a graphite rod having a squared bottom end is dipped in a paraffin wax to coat the lateral surface of the rod leaving only its end essentially free from wax. Mercury is then deposited electrolytically on the unwaxed end of the rod.

As disclosed in copending application Ser. No. 168,161, it was found that improved mercury electrodes of reproducible characteristics can be produced by a new method and process as herein described and that as a result of this new electrode, a system of anodic stripping voltammetry can be made suitable for commercial use. The system of anodic stripping voltammetry is particularly useful in testing for heavy metals such as lead, cadmium, copper and bismuth and the like, which are particularly important in the measurement of polluted atmosphere, polluted water and other environmental dangers. It has been found for example, that procedures may be employed for the testing of the atmosphere or the water, or for that matter, for the testing of blood and tissue samples to determine within realistic tolerances the amount of lead or other metal which may be present. Of particular human importance is the fact that a blood test can be performed quickly and easily to detect heavy metal poisons.

GENERAL NATURE OF THE INVENTION

According to the present invention, an improved electrode having an active electrode surface of a suitable metal is produced for anodic stripping voltammetry with gratifying reproducibility according to a preferred sequence of steps and with selected materials to form an electrode far superior to those previously known. Quantitative as well as qualitative analysis is achieved, and substantially increased testing speed has resulted. The system of anodic stripping voltammetry is useful in today's real world of environmental and social concern. Broadly speaking, a rod of support such as a chemically inert electrically conductive material is formed to a predetermined geometry. The rod may be formed of an inert electrically conductive material such as graphite, and graphite is now the preferred material. In the preferred embodiment, a carbon or graphite rod is impregnated with an insulating film-forming material such as a low melting wax, preferably by deposition under high vacuum at an elevated temperature. After cooling, the electrode is polished with an abrasive material, after which it is coated with a molten low melting wax which may be the same wax as was originally impregnated into the rod. Thereafter, the wax layer is carefully scraped off, using a blunt scraper to produce a surface ideally adapted to be coated with an electrode film. The presently preferred electrode film is mercury which is electrolytically deposited on the prepared graphite surface. The electrically insulating film-forming material assures that the electrode body is nonporous and that the particles of electrode metal deposited thereon are the only electrically conductive electrode surface.

To simplify some of the purposes of the present invention, there are various mechanical and electrochemical desiderata of an electrode for anodic stripping voltammetry in which the present electrode excels. In the first place, it is important to have a large active electrode surface area, and within limits of free flow of the test liquid, the ratio of active electrode surface area to volume of test liquid should be high, and preferably about as high as possible. Also there should be a very high ratio between metal surface area and volume of metal. An extremely thin metal layer in the order of a fraction of a micron to several microns is desired. At the same time, downwardly facing active electrode surfaces should be avoided, as in many cases, nitrogen or other bubbles are formed during electrolytic operation, and such bubbles collecting on an electrode surface are a source of serious inaccuracy. If excessive, they can completely insulate the electrode surface.

Further, great care must be taken to keep the active electrode surface on a mechanically exterior surface of the electrode. The presently preferred support electrode body is graphite, which is a porous electrically conductive, chemically inert material. If the active electrode surface coating is allowed to coat particle surfaces within the graphite body, there is a serious problem of random background electrolytic current or "noise" which both disguises the qualitative identification of metal ions and distorts the quantitative measure of such metals.

Another source of "noise" is surface irregularity of the metal electrode surface. Cracks and crevices serve to collect gas bubbles or to restrict flow of test liquid, thus preventing clearly measurable peaks of a curve representing current flow.

One extremely convenient form of test equipment for anodic stripping voltammetry disclosed in co-pending application entitled: SAMPLE HOLDER Inventor; Wayne R. Matson U.S. Ser. No. 167-330 filed July 29, 1971, employs a bank of test tube shaped containers for test liquid, the containers being accessibly mounted on a support. The electrodes are connected through selector switches to an automatic chart recorder. For testing, metals are deposited on the electrodes through a predetermined electrolytic potential range and are then anodically depleted or stripped by an anodic current of time-related increasing potential while time (corresponding to electrochemical potential) and current (corresponding to quantity of metal) are automatically charted. Accuracy of stripping the metal both at maximum current flow and immediately upon reaching the identifying potential are crucial to the use of this method of testing as a useful tool for identifying and measuring traces of metals.

The desired results are achieved to a gratifying degree with the electrode of the present invention shown in the drawings, in which.

DETAILED DESCRIPTION OF THE INVENTION

Figure 1:
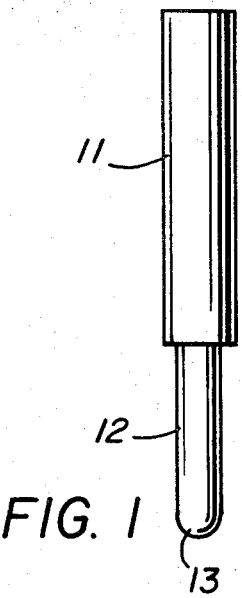
FIG. 1 is a side view of an electrode according to one embodiment of the invention.

In FIG. 1 is shown a rod shaped electrode 10 comprising a support segment 11 and an electrode segment 12. The rod is formed of graphite, preferably cylindrical in shape. The lower portion, or electrode segment 12 is highly polished. The bottom end or tip 13 is rounded to avoid a flat downward facing surface. A downwardly pointing sharply pointed cone is an excellent alternative.

Figure 2:
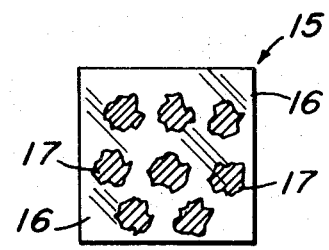
FIG. 2 is a diagrammatic enlarged or microscopic view of a portion of a support surface for the active electrode surfaces the electrode of FIG. 1.

FIG. 2 shows a microscopic enlargement of the finished electrode surface 15 before deposition of the active electrode coating. As illustrated, an essentially continuous phase of wax 16 has exposed in it minute points or islands 17 of graphite.

Figure 3:
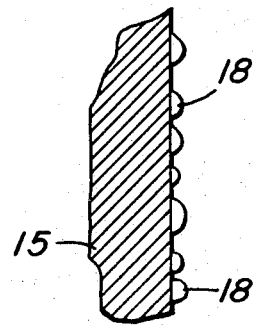
FIG. 3 is a diagrammatic cross-section of a microscopic view of the active electrode surface of the electrode of FIG. 1.

FIG. 3 illustrates a cross-section of the active electrode surface 15, in which small islands of metal 18 have been deposited on the graphic islands 17 of FIG. 2.

The active electrode surface thus comprises these islands 18 deposited on, and in electrical contact with, the graphite of the electrode. The islands sit essentially entirely on the outer surface of the smooth electrode segment 12 and appear to the naked eye as a film of metal.

The graphite rod is preferably a high density graphite, having a typical particle size or grain size of about 0.2 to 2.0 microns. The graphite is impregnated with insulating film-forming material such as a wax, or the like, to fill the pores in the rod, thus effectively preventing the electrode metal such as mercury from penetrating the pores and depositing on an interior surface and preventing stray electric currents in the electrode. When the impregnation is carried out, as in the presently preferred method of electrode preparation by vacuum evaporation or by immersion, a low melting wax is preferred, a wax melting at a temperature lower than the softening point of the normal graphite binder. A paraffin wax having a melting point of about 60° to 65° is excellent. Other film-forming insulating materials can be employed to impregnate the rod; desirably such film former should contract as little as possible and even expand slightly upon drying or hardening so as to avoid porosity in the body of the electrode.

The method of making the electrode of FIG. 1 comprises first selecting a fine grain graphite, filling its pores or voids, at least adjacent to the working surface, and removing an outer layer at the working surface to lay bare islands or points of graphite in a smooth insulating surface. The electrode metal is then electrolytically deposited on the islands.

Graphite is particularly well suited as a base or support for the electrode. It is a relatively good electrical conductor, at least for the magnitude of current here envisioned and experienced. It can be polished to an extremely smooth surface and is wet by mercury, the presently preferred electrode metal. It is chemically inert to the usual aqueous test samples. A dense, fine grain graphite having a particle size of about 0.2 to 2.0 microns is preferred.

The graphite rod is first formed into the desired shape. Being intended for use with test tube shaped liquid containers, it is formed into a rod 3 3/16 inches long and about ¼-inch diameter. The lower portion or electrode segment is carefully polished, for example, with fine carborundum paper. The tip is rounded or pointed to eliminate a downward facing flat surface. The active electrode surface area is about 2 to 3 cm, on the lateral or cylindrical surface of the rod. Being a highly polished vertical surface, it is not conductive to collecting nitrogen bubbles during use. Stirring is generally not required; but if desired ordinary stirring can be employed or a mechanical stirrer may be operated by a rod through the body of the electrode.

The rod is impregnated with a film-forming electrical insulator which is not wet by the electrode metal. Natural and synthetic resins and plastics may be employed, but a paraffin wax is presently preferred. It is easy to work with, and fully effective. When the wax is applied in molten condition or, as now preferred, by evaporation, a low melting wax is chosen so that the graphite need not be heated to a point where its natural binder is affected. A paraffin wax is the current choice. A plastic or resin, desirably applied in solution of a volatile solvent is an attractive alternative, but the extra difficulty of using such a resin has not yet been rewarded with a corresponding increase in favorable operating results.

The graphite rod may be dipped into the film former, or wax, either in solution or as a hot melt, but the method of choice is vacuum evaporation. It has been found to be important to use a good vacuum for this purpose, and best results are achieved with a vacuum of at least 1 micron of mercury. At a temperature of about 200° to 220°C. and a vacuum of about 1 micron thorough impregnation is assured in about 1 to 2 hours.

After impregnation, the rod is thoroughly cooled and is then dipped into a melt of the same wax to apply a continuous layer over at least the working electrode area and the immediately surrounding surfaces which may contact the test liquid. This layer is then cooled and removed from the working surface area by scraping or abrasion. The purpose is to produce a uniform continuous surface of the wax broken by points of graphite which have been laid bare. These points should be extremely fine and as uniform as possible and this is an important reason for selecting a fine grain graphite. The mechanical operations of electrode preparation are now complete. An electrode metal coating can now be applied, or, if desired, the electrode can be stored for subsequent plating. Instead of carbon as the electrically conducting support for the electrode, there may be employed another conductor either in coherent particulate form or in other self supporting form having a finely divided or finely pitted surface such that pores or pits may be filled to leave islands of the conductor adapted to receive a multiplicity of deposits of electrode metal. When the electrode is being employed to test for the usual heavy metals such as lead, cadmium, copper, bismuth, tantalum, strontium or other well known contaminating or poisonous metals, the electrode metal of choice is mercury.

To apply a mercury coating to the electrode surface, the electrode is dipped in a mercury electrolytic solution and a cathodic current is applied. The present procedure is to immerse the working surface in a $10^{-5}$ molar mercury ion solution in 0.1 molar sodium chloride, and apply a potential of $-0.400$ volts (versus standard calomel electrode). The mercury is allowed to diffusion plate onto the electrode surface.

Other metals are useful for the electrode surface, depending on the element of interest for which the electrode is prepared. Generally the metal should be more "noble" than the element of interest; it should be below the element of interest in the electromotive series. The element of interest should be capable of being dissolved in or diffused into the electrode metal, and being readily released therefrom by electrolytic action. For example, lead, bismuth and similar metals are capable of being dissolved in a mercury electrode and electrolytically released therefrom. Likewise, mercury or arsenic as an element or interest is capable of being dissolved in and electrolytically released from a gold electrode. For tests where the material of interest is testing is phosphate ion, a bismuth or bismuth amalgam electrode is useful. For tests of nickel, a platinum electrode is desired. A platinum-gold alloy is now considered best where anodic stripping voltammetry is employed to test for cyanide. A silver electrode is useful to test for sulfide.

A gold electrode, suitable for testing to measure minute quantities of mercury or arsenic was prepared in a manner similar to the preparation of a mercury electrode. A graphite rod was prepared by impregnating with wax and scraping graphite points clean as with the mercury electrode. The preferred procedure is to vacuum evaporate the wax to impregnate the rod, then immerse it in the wax and cool. Thereafter, the sides of the rod, or lateral areas, are scraped, finishing with a fine emery cloth.

The rod is then immersed in 0.5 molar HCl solution containing approximately $5 \times 10^{-6}$ mols gold as gold chloride. A potential of zero volts (versus standard calomel electrode) is applied for 20 minutes without stirring, followed by stirring for 20 minutes with the same applied potential. The solution is then replaced with 0.5 to 1.0 molar $HNO_3$ and the potential changed to $+0.7$ volts (versus standard calomel electrode) and allowed to rest. The electrode then is ready for electrode stripping voltammetry testing for mercury, arsenic or other ions.

Other electrode metals are deposited by supplying a similar elec deposition step, with an electrolyte solution of about one-half molar concentration containing a dissolved salt of the metal, or mixed metals, in a concentration about $10^{-5}$ or about $10^{-6}$ molar and an appropriate electrolytic deposition potential.

Because the graphite points in the electrode surface are essentially conducting islands in a surface on nonconducting wax, the metal is deposited in minute isolated droplets, one on each island. When seen by naked eye, the metal appears to be a thin film, but under a microscope, it can be seen to be many fine droplets or platelets, usually of 0.1 to 1.0 micron size.

In determining both the selection of the metal for the active electrode surface and recognizing the significance of electrode structure, the mechanical or physical action of anodic stripping voltammetry should be kept in mind. The electrolytic action on a test sample first includes plating out an ion of interest onto or into the metal electrode layer. The deposited ion either reversibly reacts with the metal, or the deposited elementor radical is soluble in it. It migrates into the electrode metal. Subsequently, the ion of interest is electrolytically released from the electrode metal while time and potential are recorded. Internal currents within the electrode body must be avoided, as must any mechanical blocking or confining of the ion or element of interest or of the liquid of the test sample. The measurements in the intended test procedure are time dependent, and therefore the time relationship must be exact.

It is for these reasons, among others, that the electrode surface must be smooth, the electrode support non porous and chemically inert, and that the electrode metal layer should be of micron or sub-micron thickness. An electrode metal structure thicker than about 5 microns is of decreased accuracy, and a layer thicker than about 10 microns is highly unreliable.

Similarly, the reversibility of reaction between the electrode metal and the ion of interest, or the reversibility of solution of the one in the other must be virtually instantaneous.

I claim:

1. An electrode for anodic stripping voltammetry adapted for testing for at least one predetermined ion in an aqueous sample comprising a porous, electrically conducting rod having an active lateral electrode surface of measured predetermined area across which essentially the entire aqueous sample can be circulated, said lateral surface being adapted to be positioned essentially virtically when the electrode is employed in a working mode, said rod comprising particles of an average size between about 0.2 and about 2 microns adhering together to form said rod, an impregnated film forming material sealing the pores of said rod and preventing penetration thereof by said aqueous sample;

the electrode surface being polished and having a structurally smooth surface comprising a surface whose area comprises a continuous surface of said film forming material and a multiplicity of islands of said electrically conducting rod material each having an average area less than about $1 \times 10^{-12}$ square centimeters, and deposited on said islands a multiplicity of islands of metal lower in the electro-motive series than the ion to be tested and acting to retain said ion upon electrolytic reduction and to release said ion in response to measured electrolytic oxidation;

the potential at which said release is brought about thus being an identification of said ion, and the quantity of electrolytic current flow accompanying said release being a measure of the quantity of said ion, said electrode metal being selected from the group consisting of gold, silver, bismuth and platinum.

2. The electrode of claim 1 adapted for testing for mercury wherein the electrode metal is gold.

3. The electrode of claim 1 adapted for testing for phosphate ion wherein the electrode metal is bismuth.

4. The electrode of claim 1 adapted for testing for nickel wherein the electrode metal is platinum.

5. The electrode of claim 1 adapted for testing for sulphide ion wherein the electrode metal is silver.

6. An electrode for anodic stripping voltammetry adapted for testing for an ion in an aqueous sample comprising a graphite rod having an active lateral electrode surface of measured predetermined area, said lateral surface being adapted to be positioned essentially vertically when the electrode is employed in a working mode, said rod comprising graphite particles of an average size between about 0.2 and about 2 microns impregnated with a wax having a melting point between about 60° and 65°C., the electrode surface being polished and having a structurally smooth surface comprising a surface whose area comprises a continuous surface of said wax and a multiplicity of islands of graphite each having an average area less than about $1 \times 10^{116}$ square centimeters and deposited on said islands a multiplicity of islands of a metal lower in the electro-motive series than the ion to be tested and capable of absorbing said ion upon electrolytic reduction.

7. The electrode of claim 6 adapted for testing for mercury wherein the electrode metal is gold.

8. The electrode of claim 6 adapted for testing for phosphate ion wherein the electrode metal is bismuth, said electrode metal being selected from the group consisting of gold, silver, bismuth and platinum.

9. The electrode of claim 6 adapted for testing for nickel wherein the electrode metal is platinum.

10. The electrode of claim 6 adapted for testing for sulphide ion wherein the electrode metal is silver.

* * * * *

PO-1050
(5/69)

UNITED STATES PATENT OFFICE
CERTIFICATE OF CORRECTION

Patent No. 3,855,099         Dated  Dec. 17, 1974

Inventor(s)  W.R. Matson

It is certified that error appears in the above-identified patent and that said Letters Patent are hereby corrected as shown below:

Column 8, line 8, delete "$10^{116}$" and insert -- $10^{-12}$ --

Signed and Sealed this seventeenth Day of February 1976

[SEAL]

Attest:

RUTH C. MASON
*Attesting Officer*

C. MARSHALL DANN
*Commissioner of Patents and Trademarks*